(12) United States Patent
Wolff et al.

(10) Patent No.: US 9,017,767 B2
(45) Date of Patent: Apr. 28, 2015

(54) METHOD OF SUPPRESSING DUST IN PILES AND RAILCARS USING PLASTICIZED CELLULOSE ETHERS

(75) Inventors: Andrew R. Wolff, Darien, IL (US); Michael T. Such, Woodridge, IL (US)

(73) Assignee: Benetech, Inc., Aurora, IL (US)

( * ) Notice: Subject to any disclaimer, the term of this patent is extended or adjusted under 35 U.S.C. 154(b) by 132 days.

(21) Appl. No.: 13/495,256

(22) Filed: Jun. 13, 2012

(65) Prior Publication Data

US 2013/0337181 A1 Dec. 19, 2013

(51) Int. Cl.
- *B05D 5/00* (2006.01)
- *B08B 17/00* (2006.01)
- *C09K 3/22* (2006.01)

(52) U.S. Cl.
CPC .. *B08B 17/00* (2013.01); *C09K 3/22* (2013.01)

(58) Field of Classification Search
None
See application file for complete search history.

(56) References Cited

U.S. PATENT DOCUMENTS

| | | |
|---|---|---|
| 1,910,975 A | 5/1933 | Wallace |
| 1,916,539 A | 7/1933 | Spencer |
| 2,204,781 A | 6/1940 | Wattles |
| 2,226,823 A | 12/1940 | Kropscott |
| 2,250,287 A | 7/1941 | Work et al. |
| 2,346,650 A | 4/1944 | Bornstein |
| 2,383,543 A | 8/1945 | Gray |
| 2,436,146 A | 2/1948 | Kleinicke et al. |
| 2,516,633 A | 7/1950 | Kesler et al. |
| 2,653,108 A | 9/1953 | Bruce |
| 2,854,347 A | 9/1958 | Booth et al. |
| 2,894,851 A | 7/1959 | Booth et al. |
| 3,337,312 A | 8/1967 | Perlus |
| 3,677,014 A | 7/1972 | Stout et al. |
| 3,708,319 A | 1/1973 | Nimerick et al. |
| 3,711,318 A | 1/1973 | Trechock et al. |
| 3,766,077 A | 10/1973 | Hwa et al. |
| 3,954,662 A | 5/1976 | Salyer et al. |
| 4,055,471 A | 10/1977 | Beck et al. |
| 4,087,572 A | 5/1978 | Nimerick |
| 4,169,170 A * | 9/1979 | Doeksen .......................... 44/541 |
| 4,214,875 A | 7/1980 | Kromley |
| 4,238,536 A | 12/1980 | Koch et al. |
| 4,264,333 A | 4/1981 | Shaw et al. |

(Continued)

FOREIGN PATENT DOCUMENTS

| | | |
|---|---|---|
| JP | 49-31589 S | 3/1974 |
| JP | 59-174695 S | 10/1984 |

(Continued)

OTHER PUBLICATIONS

Original document and machine translation of JP 2006-199837, Aug. 2006.*

(Continued)

*Primary Examiner* — Erma Cameron
(74) *Attorney, Agent, or Firm* — Nixon Peabody LLP

(57) ABSTRACT

A dust preventing crust on an exposed surface of a mass of a dusting material is formed from a dried liquid solution of a non-ionic cellulose ether, a surfactant, and water. The strength of the crust is increased by adding a plasticizer to the liquid solution prior to drying the liquid solution on the mass of dusting material. The strength of the dust preventing crust is increased over a strength of a dust preventing crust produced from drying a fluid solution comprising the non-ionic cellulose ether, the surfactant and water prior to adding the plasticizer.

21 Claims, 3 Drawing Sheets

(56) References Cited

U.S. PATENT DOCUMENTS

| | | | |
|---|---|---|---|
| 4,269,721 A | 5/1981 | Mueller et al. | |
| 4,316,811 A | 2/1982 | Burns et al. | |
| 4,326,962 A | 4/1982 | Jones et al. | |
| 4,369,121 A * | 1/1983 | Callahan et al. | 299/12 |
| 4,376,700 A | 3/1983 | Irons | |
| 4,380,459 A | 4/1983 | Netting | |
| 4,400,220 A | 8/1983 | Cole, Jr. | |
| 4,417,992 A | 11/1983 | Bhattacharyya et al. | |
| 4,427,719 A | 1/1984 | Moore | |
| 4,428,984 A | 1/1984 | Shimizu et al. | |
| 4,468,232 A | 8/1984 | Funk | |
| 4,469,612 A | 9/1984 | Fenton | |
| 4,501,593 A | 2/1985 | Paersch et al. | |
| 4,510,081 A | 4/1985 | Bronner et al. | |
| 4,551,261 A | 11/1985 | Salihar | |
| 4,561,905 A | 12/1985 | Kittle | |
| 4,582,511 A | 4/1986 | Siddoway et al. | |
| 4,594,268 A | 6/1986 | Kirwin | |
| 4,642,196 A | 2/1987 | Yan | |
| 4,650,598 A | 3/1987 | Roberts et al. | |
| 4,737,305 A | 4/1988 | Dohner | |
| 4,746,543 A | 5/1988 | Zinkan et al. | |
| 4,778,615 A * | 10/1988 | Jeglic | 252/70 |
| 4,780,233 A | 10/1988 | Roe | |
| 4,801,635 A | 1/1989 | Zinkan et al. | |
| 4,810,405 A | 3/1989 | Waller et al. | |
| 4,824,589 A | 4/1989 | Magyae et al. | |
| 4,828,576 A | 5/1989 | Bixel et al. | |
| 4,836,945 A | 6/1989 | Kestner | |
| 4,877,418 A | 10/1989 | Goleczka et al. | |
| 4,897,218 A | 1/1990 | Roe et al. | |
| 4,960,532 A | 10/1990 | Kremer | |
| 4,971,720 A | 11/1990 | Roe | |
| 4,981,398 A | 1/1991 | Field et al. | |
| 5,024,783 A | 6/1991 | Busch et al. | |
| 5,028,238 A | 7/1991 | Von Rybinski et al. | |
| 5,128,178 A | 7/1992 | Roe | |
| 5,143,645 A | 9/1992 | Roe | |
| 5,176,832 A | 1/1993 | Dorta et al. | |
| 5,192,337 A | 3/1993 | Wajer et al. | |
| 5,194,174 A | 3/1993 | Roe et al. | |
| 5,223,165 A | 6/1993 | Winstanley et al. | |
| 5,256,444 A | 10/1993 | Roe | |
| 5,271,859 A * | 12/1993 | Roe | 404/76 |
| 5,302,308 A | 4/1994 | Roe | |
| 5,310,494 A | 5/1994 | Bennett | |
| 5,328,497 A | 7/1994 | Hazlett | |
| 5,328,942 A * | 7/1994 | Akhtar et al. | 524/35 |
| 5,383,952 A | 1/1995 | Singewald et al. | |
| 5,409,626 A | 4/1995 | Muth | |
| 5,415,795 A | 5/1995 | Roe | |
| 5,436,429 A | 7/1995 | Cline | |
| 5,443,650 A | 8/1995 | Saska et al. | |
| 5,466,294 A | 11/1995 | Kearney et al. | |
| 5,527,482 A | 6/1996 | Pullen et al. | |
| 5,530,596 A | 6/1996 | Fukino et al. | |
| 5,536,429 A | 7/1996 | Bennett et al. | |
| 5,576,056 A | 11/1996 | Roe | |
| 5,578,239 A | 11/1996 | Bennett | |
| 5,595,782 A | 1/1997 | Cole | |
| 5,658,486 A | 8/1997 | Rogers et al. | |
| 5,681,878 A | 10/1997 | Klotzsche et al. | |
| 5,820,787 A | 10/1998 | McNabb et al. | |
| 5,849,364 A | 12/1998 | Nachtman et al. | |
| 5,863,456 A | 1/1999 | Pullen | |
| 5,876,622 A | 3/1999 | Pullen et al. | |
| 5,968,222 A | 10/1999 | Kodali | |
| 6,086,647 A | 7/2000 | Rahm et al. | |
| 6,124,366 A | 9/2000 | Pullen et al. | |
| 6,372,842 B1 | 4/2002 | Grisso et al. | |
| 6,409,818 B1 | 6/2002 | Johnson | |
| 6,790,245 B2 | 9/2004 | Wolff et al. | |
| 6,846,502 B1 | 1/2005 | Billmers et al. | |
| 7,157,021 B2 | 1/2007 | Bytnar et al. | |
| 7,854,857 B2 | 12/2010 | Wynne et al. | |
| 7,976,724 B2 | 7/2011 | Wolff | |
| 2003/0066456 A1 * | 4/2003 | Langford | 106/244 |
| 2004/0065198 A1 | 4/2004 | Wolff et al. | |
| 2004/0195545 A1 | 10/2004 | Gay et al. | |
| 2004/0227126 A1 | 11/2004 | Wynne et al. | |
| 2010/0140539 A1 * | 6/2010 | Weagle et al. | 252/88.1 |
| 2010/0301266 A1 | 12/2010 | Marsden et al. | |

FOREIGN PATENT DOCUMENTS

| | | |
|---|---|---|
| RU | 2061641 | 6/1996 |
| SU | 1101445 A | 7/1984 |
| WO | 82 00650 A1 | 3/1982 |
| WO | 99 24020 A1 | 5/1999 |
| WO | 00 34200 A1 | 6/2000 |
| WO | 01 81008 A2 | 11/2001 |

OTHER PUBLICATIONS

Translation of JP2006-199837, Aug. 2006.*
Dow Chemical Corporation; "Methocel Cellulose Ethers Technical Handbook," published Sep. 2002; http://msdssearch.dow.com/PublishedLiteratureDOWCOM/dh_004f/0901b8038004fa1b.pdf?filepath=methocel/pdfs/noreg/192-01062.pdf&fromPage=GetDoc.
Dowwolff Answer Center; "Methocel: Effect of Plasticizers on Film Properties in Tablet Coatings"; http://dowwolff.custhelp.com/app/answers/detail/a_id/2357/~/methocel-effect-of-plasticizers-on-film-properties-in-tablet-coatings.
Park, H.J., et al.; "Permeability and Mechanical Properties of Cellulose-Based Edible Films"; Journal of Food Science; vol. 58, No. 6; 1993; pp. 1361-1364.
Research Disclosure; "Process for Suppression of Coal Dust"; 276, 237; Apr. 1987.
Rosen, Milton; "Reduction of Surface and Interfacial Tension by Surfactants"; Surfactants and Interfacial Phenomena, 2nd Ed.; Wiley Interscience Publications (1989); pp. 207-239, 240-275, 276-303, and 337-362.
Tutumluer, Erol, et al.; "Laboratory Characterization of Coal Dust Fouled Ballast Behavior"; AREMA 2008 Annual Conference & Exposition; Sep. 21-24, 2008; Salt Lake City, UT.
"What Chemicals Are Used", FracFocus Chemical Disclosure Registry, Apr. 23, 2011, pp. 1-4.
Prenzno, "The World of Cellulose Gums", Virgo Publishing, Food Product Design, May 18, 2011, pp. 1-2.
EG&G Berthold, "Sugar Production: Massflow and Concentration Measurements, and Level Switching"; retrieved from http://www.berthold.com.au/industrial_pages/sugar%20production.html; Jul. 8, 2002.
Anonymous, "The Origins of Molasses"; retrieved from http://www.melasse.de/english/herkunft.html on Jul. 8, 2002.
Anonymous, SvG Intermol, "Dust Buster"; retrieved from http://www.svgintermol.com/products/product_pages/pr_dust_buster.htm; Apr. 15, 2002.
Anonymous, "Molasses: New uses for industry and the environment", PROSI Magazine—Jun. 1999, No. 365, Sugar Industry; retrieved from http://www.prosi.net/mag99/365june/molas365.htm; Apr. 15, 2002.
Anonymous, Organisation for Economic Co-operation and Development (OECD) Environmental Health and Safety Publications, Series on the Safety of Novel Foods and Feeds No. 3; Consensus Document on Compositional Considerations for New Varieties of Sugar Beet: Key Food and Feed Nutrients and Antinutrients; Feb. 1, 2002.
Anonymous, Pennsylvania Dairy Herd Improvement Association; "Question: Is there a place to use molasses in our TMR?", retrieved from http://www.dhia.psu.edu/DtoDApril4.htm; Apr. 15, 2002.
Curtin, Dr. Leo V., "Molasses—General Considerations" from "Molasses in Animal Nutrition", National Feed Ingredients Association, West Des Moines, Iowa, 1983.
Anonymous, Monitor Sugar Company: The Sugar Production Process; Molasses Storage and Shipping; Crystallization and Centrifugation; Evaporation; Drying and Granulation, retrieved from http://www.monitorsugar.com, Jul. 8, 2002.

(56) References Cited

OTHER PUBLICATIONS

Perez, Rena, "Molasses: Extract from FAO Tropical Database", Tropical Foods and Feeding Systems, pp. 233-239, date unknown.

Korean Intellectual Property Office, International Search Report for PCT/US2013/037620, mailed Jul. 29, 2013, Applicant Benetech, Inc.

Korean Intellectual Property Office, Written Opinion for PCT/US2013/037620, mailed Jul. 29, 2013, Applicant Benetech, Inc.

* cited by examiner

METHOD OF SUPPRESSING DUST IN PILES AND RAILCARS USING PLASTICIZED CELLULOSE ETHERS

CROSS-REFERENCE TO RELATED APPLICATIONS

N/A

FEDERALLY SPONSORED RESEARCH OR DEVELOPMENT

N/A

TECHNICAL FIELD

The invention relates to suppression of dust; more particularly, the present invention relates to an unexpectedly effective aqueous fluid of a soluble cellulose ether, a plasticizer, and one or more surfactants method for treating an exposed surface of a mass of dusting material to suppress the emanation of dust therefrom.

BACKGROUND OF THE INVENTION

The loss of material from stock piles or railcars represents both an economic loss and an environmental concern. For example, the loss of coal from an uncovered railcar during transport has been measured at about 5%, depending on the substrate and distance transported (Booth et al., U.S. Pat. No. 2,854,347). In addition, weathering of unprotected material can significantly degrade the value of that material as cited, for example, by Wattles (Wattles, U.S. Pat. No. 2,204,781). Finally, the material that is eroded from a railcar or stock pile does not simply disappear. It is re-deposited downwind of its origin, frequently to the dismay of property owners and the detriment of wildlife.

The re-deposition of material can have serious consequences. The Surface Transportation Board (STB) determined that coal dust coming off of open railcars and fouling of railroad ballast is a serious problem. The STB determined that the railroads had the right to require shippers to address the problem (STB docket number FD 35305). Coal dust was also shown in Tutumluer's paper (E. Tutumluer, W. Dombrow, H. Huang; "Laboratory Characterization of Coal Dust Fouled Ballast Behavior" AREMA 2008 Annual Conference & Exposition Sep. 21-24, 2008, Salt Lake City, Utah) to be capable of destabilizing railroad tracks after a heavy rain event, increasing the possibility of a derailment and the economic consequences attendant upon such an event.

Two methods of reducing the loss of material from stockpiles and railcars have been successfully employed in the past: treating the entire mass of material with a formula that reduces the material's inherent tendency to generate dust, or applying an encrusting agent to the exposed surface of the mass of material and forming a barrier against loss. The present invention is directed to an application of the latter technology.

There has been any number of methods put forth over many decades to address this. Wattles taught the application of molten paraffin wax to stock piles and railcars as early as 1939 (Wattles, U.S. Pat. No. 2,204,781). As natural and man-made latexes became commonly available in the early 1950's, they were also found to be effective in stemming the loss of material from stock piles and railcars (Booth et al., U.S. Pat. No. 2,854,347). At roughly the same time, vinyl addition polymers, especially water-soluble polyacrylates, polymethacrylates, polyvinyl acetate, and polyacrylamides, was similarly pressed into service as coatings for stock piles and rail cars (Booth et al., U.S. Pat. No. 2,894,851). Drying oil pile surface stabilizers, with or without catalysts were claimed in the early 1970's (Nimerick, et al., U.S. Pat. No. 3,708,319). At about the same time, either a polyacrylamide slurry or a dry polyacrylamide powder was shown to be effective in preventing wind erosion from stock piles and dry tailings ponds (Stout et. al., U.S. Pat. No. 3,677,014). Other examples of single compositions include the use of calcium sulfate (Mueller et al., U.S. Pat. No. 4,269,721), high molecular weight polyethyleneglycol (Burns et al., U.S. Pat. No. 4,316,811), or water-insoluble methacrylate copolymers (Kirwin, U.S. Pat. No. 4,594,268). The formulations also began to become more sophisticated in the late 1970's and 1980's, with combinations designed to address deficiencies in single compositions. Examples of this include: a silicone added to a latex (Nimerick, U.S. Pat. No. 4,087,572), an organic binder such as wax, tar, or asphalt combined with an organic filler such as coal (Kromrey, U.S. Pat. No. 4,214,875), coal tar emulsion combined with a wetting agent (Shaw et al., U.S. Pat. No. 4,264,333), water-soluble cellulose ethers with surfactants (Callahan, et. al. U.S. Pat. No. 4,369,121), an emulsified blend of coal tar pitch in an aromatic solvent and in which cellulose ethers were used as thickeners to aid in the stabilization of the emulsion (Kremer, U.S. Pat. No. 4,960,532), insoluble cellulose fibers applied either to the bulk of the dusting material or as a sealer over the surface of a storage pile and with or without an additional polymeric binder (Kestner, U.S. Pat. No. 4,836,945), a combination of emulsified anionic and water-soluble cationic polymers (Field, et al., U.S. Pat. No. 4,981,398). More recently compositions using cement (Walker, U.S. Pat. No. 5,530,596 and Johnson, U.S. Pat. No. 6,409,818), sugar (Cole, U.S. Pat. No. 5,595,782; Bytnar et al., U.S. Pat. No. 7,157,021; and Wynne et al., U.S. Pat. No. 7,854,857), gelatanized starch (Wolff, U.S. Pat. No. 7,976,724), and mixtures of guar gum (Marsden, et. al., U.S. Published Patent Application No. 20100301266) have all been proposed to abate material loss from stock piles and railcars.

From the above references, it is apparent that there are two critical parameters for a successful pile sealing formula: strength and thickness. Strength is essential as it relates to the basic mechanism by which a crust forms. A crust forms in most instances when a composition binds the loose particles of the bulk material at the surface into a cohesive whole. The stronger the bond between the bulk material particles, the stronger the crust and the less likely the crust will suffer from a mechanical failure that would expose unbound material which would then be lost. A certain minimum thickness is also required. Too thin a crust can be peeled off by a strong wind. It is normally sufficient to bind the top inch or so to produce a cohesive cover that will prevent material loss. In reality, the minimum effective thickness will depend on both the bulk material and the environment in which the crust is expected to survive; however, in general, thicker crusts are preferred.

Of particular note to this disclosure is Callahan's (U.S. Pat. No. 4,369,121) teaching of the use of water-soluble cellulose ethers with an additional wetting agent as a dust palliative. Water-soluble cellulose ethers are well-known in the coatings industry. Their behavior with plasticizers has been studied extensively. As long ago as 1940 it was recognized that the addition of a plasticizer weakened the tensile strength of cellulose ether films (Kropscott, U.S. Pat. No. 2,226,823). Oakley made a similar observation (Oakley, U.S. Pat. No. 2,653,108). More recently Part, et. al. quantified the same behavior specifically in methyl cellulose and hydroxypropyl methyl cellulose using, among other plasticizers, propylene glycol and glycerin (2,3-hydroxy-1-propanol) (Park, H. J., Weller, C. L., Vergano, P. J., and Testin, R. F.; Journal of Food Science, 58, #6, 1993 pp 1361-1364). A Dow Chemical website discusses not only strength, but film toughness and Young's Modulus (http://dowwolff.custhelp.com/app/answers/detail/a_id/2357/~/methocel-effect-of-plasticizers-on-film-properties-in-tablet-coatings). In every case the addition of glycerin or propylene glycol weakened the films. Marsden (U.S. Published Patent Application No. 20100301266) similarly cautions that plasticizers in his guar gum formulations "... cannot unduly decrease the strength of the matrix." It is therefore a surprising and unexpected result that the addition of a plasticizer to coatings similar to those described by Callahan would result in improved strength.

The present invention is provided to solve the problems discussed above and other problems, and to provide advantages and aspects not provided by prior dust suppression fluids of this type. A full discussion of the features and advantages of the present invention is deferred to the following detailed description, which proceeds with reference to the accompanying drawings.

SUMMARY OF THE INVENTION

One aspect of the present invention is directed to a method of treating a mass of a dusting material to prevent emanation of dust from the dusting material. The method comprises the steps of coating an exposed surface of a pile of a dusting material with a fluid solution comprising a non-ionic cellulose ether, a plasticizer, and a surfactant; and forming a crust with said exposed surface of said pile of said dusting material wherein a barrier against loss of said dusting material is formed with said exposed surface and a dried portion of said fluid solution.

The first aspect of the present invention may include one or more of the following steps, alone or in any reasonable combination. The non-ionic cellulose ether may be an alkyl-substituted cellulose ether. The alkyl-substituted cellulose ether may be methylcellulose. The non-ionic cellulose ether may be a hydroxyalkyl cellulose ether. The hydroxyalkly cellulose ether may be hydroxypropyl cellulose ether. The hydroxyalkly cellulose ether may be hydroxyethyl cellulose ether. The non-ionic cellulose ether may be at least a partially substituted hydroxyalkyl alkylcellulose ether, also sometimes referred to as an alkyl hydroxyalkyl cellulose ether. The hydroxyalkyl alkylcellulose ether may be hydroxypropyl methylcellulose ether. The hydroxyalkyl alkylcellulose ether may be hydroxyethyl methylcellulose ether. The plasticizer may be selected from a group of cellulose ether plasticizers consisting of polyols, diols, sugars, fatty acids, fatty acid esters, and polyhydridic alcohols. The plasticizer may be selected from a group consisting of alkylene glycols, dialkylene glycols, sugars and glycerin. The plasticizer may be selected from propylene glycol, diethylene glycol, or glycerin. The plasticizer may be glycerin. The surfactant may be selected from the group consisting of surfactants known to be effective on the dusting material to be encrusted. The surfactant may be known to be effective on coal. The surfactant may be selected from the group consisting of salts of alkyl benzene sulfonates, dialkyl sulfosuccinates, fatty acid amides, quaternary ammonium compounds, organic phosphate esters, ethylene oxide-propylene oxide block copolymers, nonionic fatty acid alcohol ethoxylates, nonionic fatty acid alcohol mixed ethoxylate-propoxylates, synthetic alcohol ethoxylates, and synthetic alcohol mixed ethoxylate-propoxylates. The surfactant may be selected from the group consisting of solutions of salts of alkyl benzene sulfonates, dialkyl sulfosuccinates, nonionic fatty acid alcohol ethoxylates, and synthetic alcohol ethoxylates.

A second aspect of the present invention is directed to a method of preventing the emanation of dust comprising the steps of applying a non-ionic cellulose ether solution including a plasticizer and surfactant to a mass of a dusting material.

The second aspect of the present invention may include one or more of the following steps, alone or in any reasonable combination. The solution may be applied at a rate of between 0.005 gallons per square foot and 0.2 gallons per square foot.

A third aspect of the present invention is directed to a method of increasing the strength of a dust preventing crust on an exposed surface of a mass of a dusting material wherein the crust is formed from a dried liquid solution applied to the exposed outer surface of the mass of the dusting material and wherein the solution comprises a non-ionic cellulose ether, a surfactant and water. The method comprises the steps of adding a plasticizer to the liquid solution prior to drying the liquid solution on the mass of dusting material wherein a strength of the dust preventing crust is increased over a strength of a dust preventing crust produced from drying a fluid solution comprising the non-ionic cellulose ether, the surfactant and water.

The third aspect of the present invention may include one or more of the following steps, alone or in any reasonable combination. The non-ionic cellulose ether may have a viscosity between 3 cPS and 100,000 cPS when measured at a concentration of 2.5 percent. The plasticizer may be a glycerin. The non-ionic cellulose ether may be a hydroxypropyl methylcellulose ether. The percentage of the plasticizer in the solution may be no more than 125 percent weight of the non-ionic cellulose ether. The percentage of the non-ionic cellulose ether may be no more than 20 percent by weight of the solution. The percentage of the non-ionic cellulose ether may be no more than 20 percent by weight of the solution, and the percentage of the plasticizer is no more than 125 percent by the weight of the non-ionic cellulose ether.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
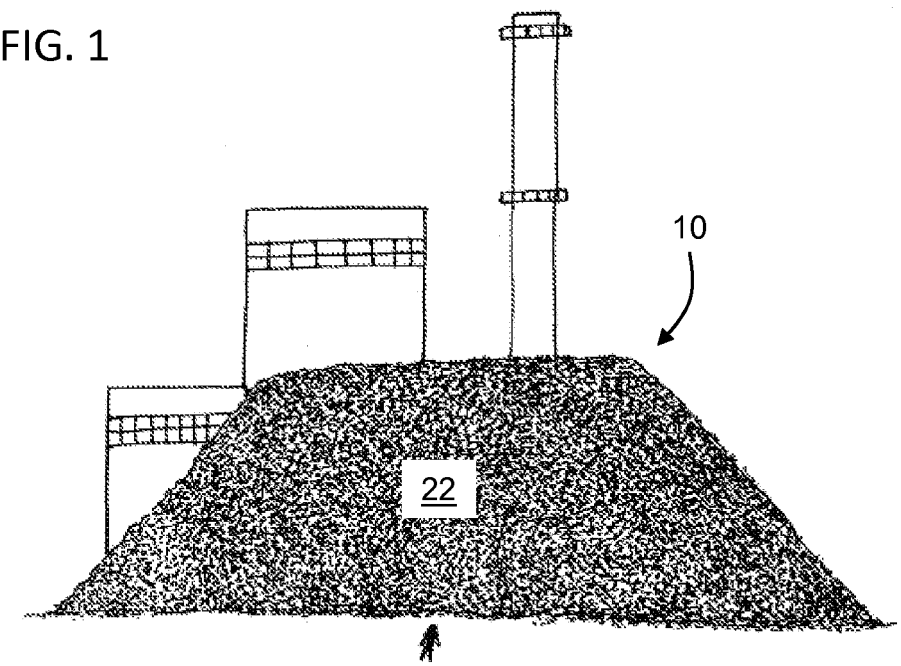
FIG. 1 is a schematic of a mass of a dusting material, such as coal, in relation to a size of person.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is a significant improvement on previous work in that it increases both the strength and thickness of crusts produced using water-soluble cellulose ethers. The previous work, specifically Callahan's U.S. Pat. No. 4,369,121, showed that crusts for stock piles or railcars produced from water-soluble cellulose ethers benefitted from the addition of a surfactant to increase the penetration of the solution into the bulk material. The present invention, contrary to expectations, adds a plasticizer which is well-known to weaken the strength of soluble cellulose ethers, instead actually strengthens the crust formed in these applications. Such formulas are also thicker than similar formulas without the plasticizer. Water-soluble cellulose ether formulations containing plasticizers and surfactants of the present invention are found to offer a significant improvement in strength and crust thickness when compared to similar formulas which lack plasticizers.

The majority of the present work has been performed on coal. However, one skilled in the art will recognize that this invention is equally applicable to a wide range of dusting bulk materials, examples of which include, and are not limited to: taconite, limestone, crushed rock, gravel, sand, gypsum, cement, ash, petroleum and metallurgical coke, wood chips, biomass, compressed pelletized wood dust, and a variety of industrial ores.

The present invention relates to the use of water-soluble cellulose ethers to form crusts over a variety of materials. In general, water-soluble cellulose ethers are dispersed in water and stirred until fully hydrated, producing a homogeneous solution. The plasticizer and surfactant are added at any point during the manufacturing step and the material is sprayed onto a pile or railcar surface.

The first step, dispersing and hydrating the cellulose ether can be accomplished in a number of ways as detailed in the "Methocel Cellulose Ethers Technical Handbook" available from Dow Chemical Corporation's web site: (http://www.dow.com/webapps/lit/litorder.asp?filepath=methocel/pdfs/noreg/192-01062.pdf&pdf=true), which is hereby incorporated by reference as if fully set forth herein. It has been found to be particularly convenient to use a powder eductor such as the devices offered by Compatible Components (www.ccc-mix.com) to disperse cellulose ether powders.

The class of cellulose ethers includes methylcellulose, ethyl cellulose, hydroxyethyl cellulose, hydroxypropyl cellulose, hydroxyethyl methylcellulose, hydroxypropyl methylcellulose, and generally hydroxyalkyl methylcellulose such as those sold by Dow Chemical Corporation under the trade name "METHOCEL." We have found methylcellulose is very effective in this technology, and particularly the moderate viscosity materials that would form a 4,000 cPs viscosity solution at 2.5 wt. %. At the same time, lower viscosity hydroxypropyl methylcellulose, such as material that will form a 400 cPs solution at 2.5 wt. %, can be equally effective if employed at slightly greater concentrations. Viscosity for cellulose ethers is generally used to define different molecular weights. Thus, a 400 cPs methylcellulose will have a viscosity of 400 cPs at a concentration of 2.5%, and a 4000 cPs methylcellulose will have a viscosity of 4,000 cPs at a concentration of 2.5%. Lower concentrations will have lower viscosities. We found that this crust strengthening effect upon addition of a plasticizer does not extend to carboxymethylcellulose.

A number of different plasticizers, including diethylene glycol, propylene glycol, glycerin, triethanolamine, dextrose, and pentaerythritol have been tested during development of the present invention, and we have no indication that this is not a general phenomenon of all plasticizers in this application. From an economic standpoint some of these plasticizers are more cost effective. In particular, glycerin is effective and abundant in the current market as it is a byproduct from biodiesel production. As markets change, and particularly as glycerin becomes a preferred chemical feedstock, diethylene glycol and dextrose are expected to remain economically viable alternatives to glycerin.

Cross-linking agents, e.g., glyoxal, have been examined in these systems and lead to a further increase in strength for crusts produced in this manner. This is as would be expected, and it is further expected that similar improvements could be gained in the strength of the crust with other cross-linking systems such as those reported by Marsden et al. (U.S. Published Patent Application No. 20100301266) and references therein.

As Callahan (U.S. Pat. No. 4,369,121) pointed out, wetting agents are essential to control the penetration of the cellulose ether encrusting solution into the surface of the pile. Fortunately, this area of dust control is well-understood, and solutions of salts of alkyl benzene sulfonates, dialkyl sulfosuccinates, fatty acid amides, quaternary ammonium compounds, organic phosphate esters, nonionic fatty acid alcohol ethoxylates and mixed ethoxylate-propoxylates, as well as synthetic alcohol ethoxylates and mixed ethoxylate-propoxylates have all been used in the past. Commercial preparations are available from a number of manufacturers, and in the present invention, materials produced by Benetech, Inc., of Aurora, Ill. have been employed. It is contemplated that cationic, anionic, or nonionic surfactants can be used with this invention.

The addition of reinforcing agents such as those taught by Kestner (U.S. Pat. No. 4,836,945) may be effective in these formulations as they are effective in non-plasticized cellulose ether formulas.

The application rate for the mixture can vary widely. In general, more is better, but at some point maximum dust control is achieved and adding additional encrusting agent has no performance benefit and an economic penalty. Thus, application rates between 0.005 gallons per square foot (0.20 liters per square meter) and 0.2 gallons per square foot (8.25 liters per square meter) will all give functional crusts. We have found the more effective application rates to be between 0.03 gallons per square foot (1.2 liters per square meter), and 0.08 gallons per square foot (3.3 liters per square meter). Most effective application rates are generally in the range of 0.040 gallons per square foot to 0.055 gallons per square foot (1.6 liters per square meter to 2.2 liters per square meter).

One formula of the present invention comprises a fluid solution of a non-ionic cellulose ether, a surfactant, and a plasticizer. This solution is applied to a mass or pile of dusting material to form a crust on an exposed surface of the mass. The crust is formed with the exposed surface and a dried portion of the solution. This forms a barrier against loss of the dusting material caused by environmental conditions, such as erosion.

The non-ionic cellulose ether is an alkyl-substituted cellulose ether, such as methylcellulose. Alternatively, the non-ionic cellulose ether is at least a partially substituted hydroxyalkyl cellulose ether, such as a hydroxypropyl methylcellulose ether or hydroxyethyl methylcellulose ether.

The plasticizer is selected from a from a group of cellulose ether plasticizers. The group consists of polyols, diols, sugars, fatty acids, fatty acid esters, and polyhydridic alcohols. More specifically, the plasticizer is selected from a group consisting of alkylene glycols, dialkylene glycols, sugars and glycerin. Most specifically, the plasticizer is selected from propylene glycol, diethylene glycol, or glycerin, preferably glycerin.

The surfactant is selected from any group of surfactants known to be effective on the dusting material to be encrusted. For example, if the dusting material is coal, the selected surfactant is known to be effective on coal. Examples of suitable surfactants include salts of alkyl benzene sulfonates, dialkyl sulfosuccinates, fatty acid amides, quaternary ammonium compounds, organic phosphate esters, ethylene oxide-propylene oxide block copolymers, nonionic fatty acid alcohol ethoxylates, nonionic fatty acid alcohol mixed ethoxylate-propoxylates, synthetic alcohol ethoxylates, and synthetic alcohol mixed ethoxylate-propoxylates. Generally preferred compositions include salts of alkyl benzene sulfonates, dialkyl sulfosuccinates, nonionic fatty acid alcohol ethoxylates, and synthetic alcohol ethoxylates.

As explained above, the formula of the present invention is designed to increase the strength of a dust preventing crust on an exposed surface of a mass of a dusting material. The crust is formed from the dried liquid solution applied to the exposed outer surface of the mass of the dusting material. The crust may include portions of uncoated exposed surface of the dusting material as well. The solution comprises non-ionic cellulose ether, a surfactant and water. A plasticizer is added to the liquid solution prior to drying the liquid solution on the mass of dusting material. The strength of the dust preventing crust is increased over the strength of a dust preventing crust produced from drying a fluid solution comprising the non-ionic cellulose ether, the surfactant and water. The non-ionic cellulose ether preferably has a viscosity between 3 cPs and 100,000 cPs when measured at a concentration of 2.5 percent in water, and more preferably between 50 cPS and 10,000 cPS, e.g., a hydroxypropyl methylcellulose ether having the prescribed viscosity and making up no more than 20 percent by weight of the solution. The plasticizer is preferably glycerin at no more than 125 percent weight of the non-ionic cellulose ether.

Thus, a typical formula would be produced by dispersing 420 lbs of low viscosity (about 400 cPS for a 2.5% solution) hydroxypropyl methylcellulose in a 5,000 gallon water solution containing 145 lbs of glycerin and approximately 420 lbs of a commercial dust wetting formulation such as BT-205W (supplied by Benetech, Inc. of Aurora, Ill.). The solution is stirred for two hours to insure complete hydration of the cellulose ether then applied to a pile or railcar surface at a rate of 0.046 gallons per square foot or 1.9 liters per square meter.

EXAMPLES

Example 1

Measurement of Strength for Plasticized and Non-Plasticized Cellulose Ether Formulations To a sample of damp 18 mesh to 60 mesh (1 mm-0.25 mm) sub-bituminous coal was added a solution of 1.5 wt. % 400 cPs hydroxypropyl methylcellulose (HPMC). The solutions contained 1.0 wt. % commercial coal wetting solution concentrate (BT-205W supplied by Benetech, Inc.). The solution also contained plasticizers of the indicated composition. The amount added was such that the total mass of the sample was comprised of 20 wt. % or 25 wt. % of the solution with the remaining 80 wt. % or 75 wt. % coal. The samples were mixed and pressed into 30 mm diameter round plastic forms with a depth of 15 mm. The samples were heated to 40° C. overnight and in the morning cooled and broken using a force gauge. The maximum force required (in milliNewtons) to break the sample was divided by the mass of the sample (in grams) to give a specific strength that was independent of the mass of the sample. Results are shown in Table 1, with the lowest strength measurements underlined boxes and the highest strength measurements in double underlined boxes. Each of the listed combined results is the average of 26 data points unless otherwise noted:

TABLE 1

Specific Strengths of Coal-HPMC Articles after Drying

| Composition | 20% Solution Addition (9 Samples) | 25% Solution Addition (17 Samples) | Combined Results |
| --- | --- | --- | --- |
| 1.5% HPMC Solution, no Plasticizer | 1827.1 mN/g | 2326.1 mN/g (15 samples) | 2139.0 mN/g (24 samples) |
| 1.5% HPMC Solution + 0.5% Pentaerythrytol | 2428.2 mN/g | 3604.6 mN/g | 3197.4 mN/g |
| 1.5% HPMC Solution + 0.5% Triethanolamine | 2369.92 mN/g | 2756.50 mN/g | 2622.7 mN/g |
| 1.5% HPMC Solution + 0.5% Glycerin | 2205.6 mN/g | 2587.2 mN/g | 2455.1 mN/g |
| 1.5% HPMC Solution + 0.25% Glycerin | 2572.9 mN/g | 2747.6 mN/g | 2687.1 mN/g |
| 1.5% HPMC Solution + 0.5% Propylene glycol | 2672.93 mN/g | 2915.96 mN/g | 2831.8 mN/g |
| 1.5% HPMC Solution + 0.5% Diethylene Glycol | 2617.3 mN/g | 2912.9 mN/g | 2810.6 mN/g |
| 1.5% HPMC Solution + 0.5% Dextrose | 2328.2 mN/g | 2816.7 mN/g | 2647.6 mN/g |

As can be seen, in all cases the addition of a plasticizer strengthened the articles. The clear implication is that when these solutions are applied to a substrate to form a crust, the crust formed using a cellulose ether and surfactant solution with a plasticizer will be stronger than one formed from the cellulose ether and surfactant solution without a plasticizer.

Example 2

Examination of the Effect of Cellulose Ether Chemistry on the Strength of Coal Crusts To a sample of 18 mesh to 60 mesh (1 mm-0.25 mm) sub-bituminous coal was added a solution of 1.5 wt. % of various cellulose ethers. The cellulose ethers were produced by Dow Chemical Corporation and their chemistry and nomenclature are discussed in the previously cited "Methocel Cellulose Ethers Technical Handbook" available from Dow's web site. All cellulose ethers were of the same viscosity grade: 4,000 cPs at a 2.5 wt. % solution. The chemistries ranged from "A" chemistry which was pure methylcellulose, through "E", "F", "J", and "K" chemistries. Of the hydroxypropyl-substituted cellulose ether chemistries it is worth noting that "F" chemistry has the least amount of hydroxypropyl substitution. The solutions contained approximately 22 wt. % commercial coal wetting solution concentrate (BT-205W supplied by Benetech, Inc.). The amount added was such that the total mass of the sample was comprised of 25 wt. % of the solution with the remaining 75 wt. % coal. The samples were mixed and pressed into 30 mm diameter round plastic forms with a depth of 15 mm. The samples were heated to 40° C. overnight and in the morning cooled and broken using a force gauge. The results are detailed in Table 2. Each result is the average of nine tests.

TABLE 2

| Chemistry | A | E | F | J | K |
|---|---|---|---|---|---|
| Breaking force | 84 N | 32 N | 38 N | 24 N | 20 N |

As can be seen, the "A" chemistry, that is, pure methylcellulose, produces a much stronger composite than any of the various hydroxypropyl-substituted methylcelluloses.

Example 3

Measurement of Strength for Plasticized and Non-Plasticized Sodium Carboxymethylcellulose Ether Formulations To a sample of dry fresh-ground 18 mesh to 60 mesh (1 mm-0.25 mm) sub-bituminous coal was added a solution of 4.0 wt. % sodium Carboxymethylcellulose (supplied by Ashland Chemical, Aqualon Division, type 7L). The solutions contained 0.5 wt. % commercial coal wetting solution concentrate (BT-210WF supplied by Benetech, Inc.). The solution also contained plasticizers of the indicated composition. The amount added was such that the total mass of the sample comprised 25 wt. % of the solution with the remaining 75 wt. % coal. The samples were mixed and pressed into 30 mm diameter round plastic forms with a depth of 15 mm. The samples were heated to 41° C. overnight and in the morning cooled and broken using a force gauge. The maximum force required (in Newtons) to break the sample was divided by the mass of the sample (in grams) to give a specific strength that was independent of the mass of the sample. Results are shown in Table 3, and each number represents the average of nine samples.

TABLE 3

| Test solution | Specific Strength |
|---|---|
| 4% 7L CMC 0.5% 210WF | 13.10 N/g |
| 4% 7L CMC 0.5% 210WF, 0.8% glycerin | 12.10 N/g |
| 4% 7L CMC 0.5% 210WF 1.6% glycerin | 11.98 N/g |
| 4% 7L CMC 0.5% 210WF 0.8% diethylene glycol | 12.38 N/g |
| 4% 7L CMC 0.5% 210WF 1.6% diethylene glycol | 12.59 N/g |

As can be seen, and unlike nonionic cellulose ethers, we found no increase in strength for articles formed from carboxymethylcellulose with plasticizers, and possibly a slight decrease in strength. The higher strengths compared to the first example are attributed to the higher concentrations of sodium carboxymethylcellulose compared to HPMC discussed in the first example.

General Procedure for Evaluation of Crusts:

For Examples 4-8, the procedure outlined herein was used to evaluate the ability of the experimental formulas to form crusts: Sub-bituminous coal was sieved with the fraction less than one inch (25.4 mm) collected. The coal was moistened until visible surface moisture was present, roughly matching the surface moisture of fresh-mined coal. Three to six kilogram portions of this coal were taken and divided into samples of about 990 grams each. The samples were placed and loosely leveled (not compacted) in trays using disposable 8.5" diameter aluminum pie plates. The samples were labeled and treated at the noted rate with the test solutions. The samples were then allowed to dry overnight and subsequently deionized water was applied at the equivalent of about ¹⁄₂₀th of an inch (~1 mm) of rain. The samples were again dried overnight and then wet with the equivalent of ¹⁄₁₀ inch of rain (2.5 mm). The samples were then heated under heat lamps to between 40° C. and 60° C. for four hours to simulate the effect of hot sun on the treated crust. Samples were cooled and the crust was broken using a force gauge. The maximum force was recorded and the pieces were weighed to determine the mass of the crust formed. Using the density of the coal and the diameter of the crust, the thickness was then calculated.

Example 4

Addition of Plasticizer or Surfactant to HPMC

Solutions of 2.5% 400 cPs HPMC and 1.0% BT-205W were treated with either 1.0% BT-205W surfactant mixture (A) or 5.00% glycerin (B). The solutions were applied at an application rate of 0.024 gallons per square foot. Three trays of each solution with coal were prepared and treated as per the general procedure above to give the following results (Table 4):

TABLE 4

| Test | Thickness, in | Strength, psi |
|---|---|---|
| Solution A (surfactant) | 0.41 | 112 |
| Solution B (plasticizer) | 0.49 | 116 |

As can be seen, the HPMC solution treated with the plasticizer gave greater thickness and strength crust measurements than the HPMC solution containing a surfactant solution.

Example 5

Addition of Plasticizer to HPMC and Surfactant Formula

Solutions of 1.5% 400 cPs HPMC and 1.0% BT-205W (A) and 1.5% 400 cPs HPMC with 1.0% BT-205W and 0.5% glycerin (B) at an application rate of 0.035 gallons per square foot were tested. Four trays of each solution with coal were prepared and treated as per the general procedure above to give the following results (Table 5):

TABLE 5

| Test | Thickness, in | Strength, psi |
|---|---|---|
| Solution A | 0.26 | 64 |
| Solution B | 0.27 | 94 |

As can be seen, the addition of a plasticizer was effective in increasing the strength, and may have increased the thickness of the crust.

Example 6

Differing Molecular Weights of Cellulose Ethers

Solutions of two different cellulose ethers were prepared. Solution A contained 1.0% 400 cPs HPMC, 0.35% glycerin, and 1.0% BT-205W. Solution B contained 0.5% 4,000 cPs methylcellulose, 0.35% glycerin, and 1.0% BT-205W. Four trays of each solution with coal were prepared and treated as per the general procedure above at an application rate of 0.04 gallons per square foot to give the following results (Table 6):

TABLE 6

| Test | Thickness, in. | Strength, psi |
| --- | --- | --- |
| Solution A | 0.95 | 113 |
| Solution B | 0.93 | 125 |

As can be seen, 4,000 cPs viscosity methylcellulose produced similar results to the 400 cPs viscosity HPMC at about half the concentration of the 400 cPs viscosity HPMC.

Example 7

The Benefit of Adding a Cross-Linker

Solutions of two different cellulose ethers were prepared. Solution A contained 1.5% 400 cPs HPMC, 0.50% glycerin, and 1.0% BT-205W. Solution B contained 1.5% 400 cPs HPMC, 0.50% glycerin, 1.0% BT-205W, 0.1% glyoxal solution (40%), and sufficient acetic acid to make the pH<5. Three trays of each solution with coal were prepared and treated as per the general procedure above at an application rate of 0.04 gallons per square foot to give the following results (Table 7):

TABLE 7

| | Thickness, in. | Strength, psi |
| --- | --- | --- |
| Solution A | 0.80 | 74 |
| Solution B | 0.83 | 93 |

As can be seen, the addition of a cross-linking agent further strengthens the crust and may also produce a thicker crust.

Example 8

Reproducibility of Testing

To confirm that the test results we were observing were significant and reproducible, we repeated the experiment in Example 7, preparing four more trays of each formula (Table 8):

TABLE 8

| Test | Thickness, in. | Strength, psi |
| --- | --- | --- |
| Solution A | 0.69 | 68 |
| Solution B | 0.77 | 88 |

As can be seen, while not precisely identical to Table 7, given the variability of sub-bituminous coal in general, the variations between the two experimental results are minor.

One of ordinary skill in the art would readily appreciate that the fluid solution of the present invention is dried to form a crust over the exposed surface of a mass or pile of a dusting material, e.g. coal. The mass or pile of the dusting material may be within a railcar, a stockyard, or similar location. As used in the present Application, the phrase "mass or pile of dusting material" refers particularly to any conglomeration of dusting material lumps or pieces." Thus, a crust formed over an exposed surface of a mass or pile of a dusting material differs materially from a full body treatment using a dust suppressant in which individual particles of dusting material are sprayed rather than an exposed surface of a mass of dusting material. For instance, a full body treatment of a dusting material using a dust suppressant may spray individual on particles of dusting material as they are transported on a conveyor. Again, the present invention does not treat individual fines of a dusting material. Instead, a crust is formed on an exposed surface of a bulk mass or pile of the dusting material.

Figure 2:
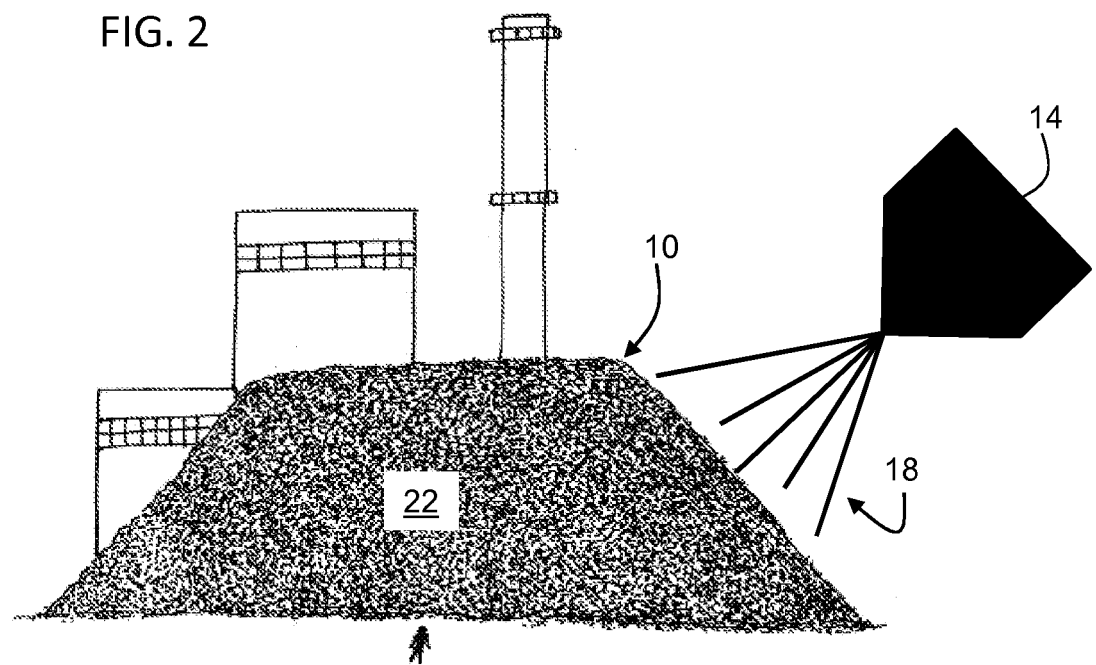
FIG. 2 is a schematic of the mass of the dusting material being treated with a liquid solution of the present invention.
Figure 3:
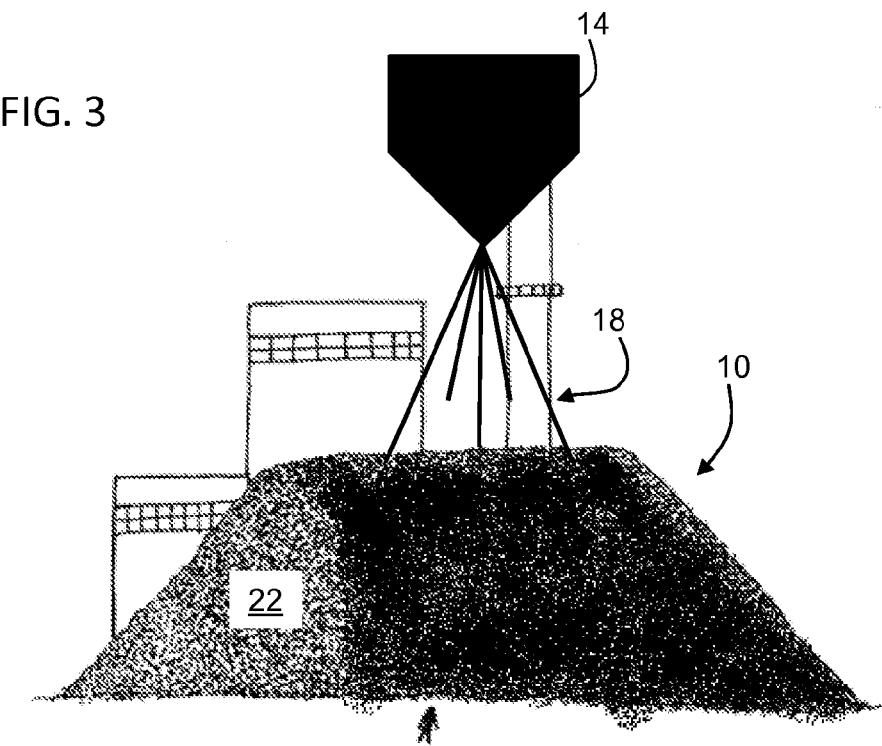
FIG. 3 is a schematic of the mass of the dusting material subsequent to partial treatment with a liquid of the present invention.
Figure 4:
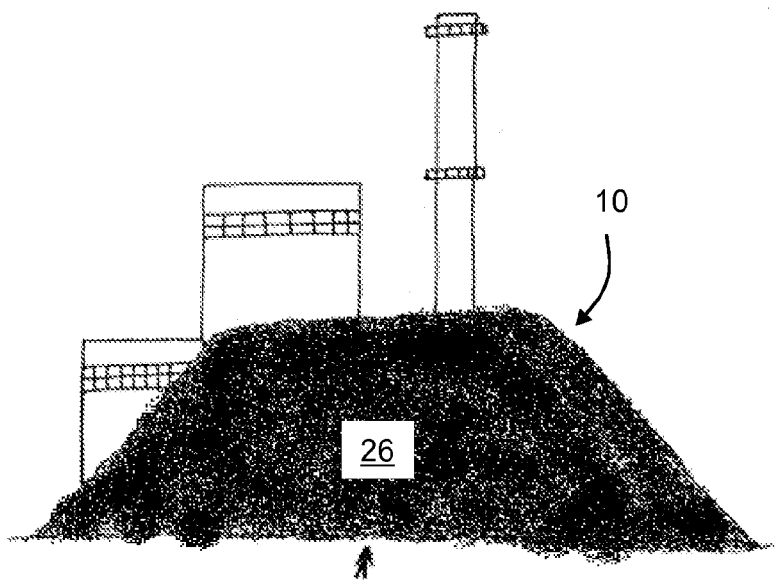
FIG. 4 is a schematic of the mass of the dusting material subsequent to treatment with a liquid of the present invention and wherein a dried liquid solution forms a crust on the previously fully exposed outer surface of the mass of dusting material.
Figure 5:
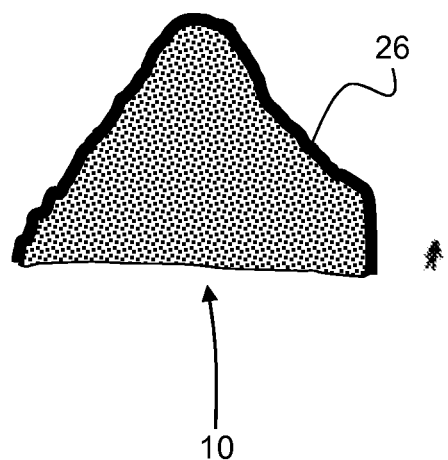
FIG. 5 is a schematic cross-section of the mass of the dusting material subsequent to treatment with a liquid solution of the present invention and subsequent to drying the liquid solution to form a crust of the present invention.

Accordingly, and with reference to FIGS. 1-5, a mass or pile of a dusting material 10 is positioned in a stockyard. An applicator 14 sprays a liquid solution 18 of the present invention onto an exposed outer surface 22 of the mass or pile 10. The solution 18 is dried to form a crust 26 on the previously, fully exposed outer surface. The crust 26 forms a barrier which reduces or prevents emanation of airborne dust particles from entering the surrounding atmosphere.

While the specific embodiments have been illustrated and described, numerous modifications come to mind without significantly departing from the spirit of the invention, and the scope of protection is only limited by the scope of the accompanying Claims.

What is claimed is:

1. A method of increasing the strength of a dust preventing crust on an exposed surface of a mass of a dusting material made up of a conglomeration of dusting material lumps or pieces wherein the crust binds loose particles of the dusting material at an exposed surface into a cohesive whole, wherein the crust is formed from a dried liquid solution applied to the exposed outer surface of the mass of the dusting material, and wherein the solution comprises a non-ionic cellulose ether, a surfactant and water comprising the steps of:
adding a plasticizer to the liquid solution prior to drying the liquid solution on an exposed surface of the mass of dusting material having a temperature less than 40° C. wherein a strength of the dust preventing crust is increased over a strength of a dust preventing crust produced from drying a fluid solution comprising the non-ionic cellulose ether, the surfactant and water.

2. The method of claim 1 wherein the non-ionic cellulose ether has a viscosity between 3 cPs and 100,000 cPs as measured at a concentration of 2.5 percent in water.

3. The method of claim 1 wherein the plasticizer is glycerin.

4. The method of claim 1 wherein the non-ionic cellulose ether is a hydroxypropyl methylcellulose ether.

5. The method of claim 1 wherein a percentage of the plasticizer in the solution is no more than 125 percent weight of the non-ionic cellulose ether.

6. The method of claim 1 wherein a percentage of the non-ionic cellulose ether is no more than 20 percent by weight of the solution.

7. The method of claim 1 wherein a percentage of the non-ionic cellulose ether is no more than 20 percent by weight of the solution, and a percentage of the plasticizer is no more than 125 percent by the weight of the non-ionic cellulose ether.

8. A method of treating a mass of a dusting material to prevent emanation of dust from the dusting material comprising the steps of:
coating an exposed surface of a pile of a dusting material at a temperature less than 40° C. with a fluid solution comprising a non-ionic cellulose ether, a plasticizer, and a surfactant; and
forming a crust with said exposed surface of said pile of said dusting material wherein a barrier against loss of said dusting material is formed with said exposed surface and a dried portion of said fluid solution wherein said crust binds a top inch of the pile of dusting material to produce a cohesive cover preventing a material loss of the pile.

9. The method of claim 8 wherein the non-ionic cellulose ether is an alkyl-substituted cellulose ether.

10. The method of claim 9 wherein the alkyl-substituted cellulose ether is methylcellulose.

11. The method of claim 8 wherein the non-ionic cellulose ether is at least a partially substituted hydroxyalkyl alkylcellulose ether.

12. The method of claim 11 wherein the hydroxyalkyl alkylcellulose ether is hydroxypropyl methylcellulose ether.

13. The method of claim 12 wherein the hydroxyalkyl alkylcellulose ether is hydroxyethyl methylcellulose ether.

14. The method of claim 8 wherein the plasticizer is selected from a group of plasticizers for cellulose ether consisting of polyols, diols, sugars, fatty acids, fatty acid esters, and polyhydridic alcohols.

15. The method of claim 8 wherein the plasticizer is selected from a group consisting of alkylene glycols, dialkylene glycols, sugars and glycerin.

16. The method of claim 8 wherein the plasticizer is selected from propylene glycol, diethylene glycol, or glycerin.

17. The method of claim 8 wherein the plasticizer is glycerin.

18. The method of claim 8 wherein the surfactant is selected from the group consisting of surfactants known to be effective on the dusting material to be encrusted.

19. The method of claim 8 wherein the surfactant is known to be effective on coal.

20. The method of claim 8 wherein the surfactant is selected from the group consisting of salts of alkyl benzene sulfonates, dialkyl sulfosuccinates, fatty acid amides, quaternary ammonium compounds, organic phosphate esters, ethylene oxide-propylene oxide block copolymers, nonionic fatty acid alcohol ethoxylates, nonionic fatty acid alcohol mixed ethoxylate-propoxylates, synthetic alcohol ethoxylates, and synthetic alcohol mixed ethoxylate-propoxylates.

21. The method of claim 8 wherein the surfactant is selected from the group consisting of solutions of salts of alkyl benzene sulfonates, dialkyl sulfosuccinates, nonionic fatty acid alcohol ethoxylates, and synthetic alcohol ethoxylates.

* * * * *